(12) United States Patent
Lourenco et al.

(10) Patent No.: US 11,486,636 B2
(45) Date of Patent: Nov. 1, 2022

(54) METHOD TO RECOVER LPG AND CONDENSATES FROM REFINERIES FUEL GAS STREAMS

(71) Applicants: 1304338 Alberta Ltd, Edmonton (CA); 1304342 Alberta Ltd, Edmonton (CA)

(72) Inventors: Jose Lourenco, Edmonton (CA); MacKenzie Millar, Edmonton (CA)

(73) Assignees: 1304338 ALBERTA LTD, Edmonton (CA); 1304342 ALBERTA LTD, Edmonton (CA)

( * ) Notice: Subject to any disclaimer, the term of this patent is extended or adjusted under 35 U.S.C. 154(b) by 467 days.

(21) Appl. No.: 14/400,213

(22) PCT Filed: May 10, 2013

(86) PCT No.: PCT/CA2013/050363
§ 371 (c)(1),
(2) Date: Nov. 10, 2014

(87) PCT Pub. No.: WO2013/166608
PCT Pub. Date: Nov. 14, 2013

(65) Prior Publication Data
US 2015/0143842 A1    May 28, 2015

(30) Foreign Application Priority Data

May 11, 2012   (CA) ..................................... 2772416
Sep. 21, 2012  (CA) ..................................... 2790961

(51) Int. Cl.
*F25J 3/02*    (2006.01)
*F25J 1/00*    (2006.01)
(Continued)

(52) U.S. Cl.
CPC ............. *F25J 1/0022* (2013.01); *C01B 3/506* (2013.01); *C10G 5/06* (2013.01); *F25J 3/0219* (2013.01);
(Continued)

(58) Field of Classification Search
CPC ...... F25J 3/0219; F25J 2200/74; F25J 3/0233; F25J 3/0655; F25J 3/0252
See application file for complete search history.

(56) References Cited

U.S. PATENT DOCUMENTS 2,168,438 A    8/1939  Carrier
3,002,362 A    10/1961 Morrison
(Continued)

FOREIGN PATENT DOCUMENTS

CA    1048876 A     2/1979
CA    2 422 893 A1  2/2002
(Continued)

OTHER PUBLICATIONS

International Search Report and Written Opinion dated Aug. 2, 2013, issued in corresponding International Application No. PCT/CA2013/050363, filed May 10, 2013, 9 pages.
(Continued)

*Primary Examiner* — John F Pettitt, III
(74) *Attorney, Agent, or Firm* — Christensen O'Connor Johnson Kindness PLLC

(57) ABSTRACT

A method to recover olefins and $C_2^+$ fractions from refineries gas streams. The traditional recovery methods employed at refineries are absorption with solvents and cryogenic technology using compression and expansion aided by external refrigeration systems. In contrast to known methods, there is provided first a pre-cooling heat exchanger on a feed line feeding the gas stream to a in-line mixer, secondly by injecting and mixing a stream of LNG to condense the $C_2^+$
(Continued)

fractions upstream of the fractionator. The temperature of the gas stream entering the fractionator is monitored downstream of the in-line mixer. A LNG stream is temperature controlled to flow through the injection inlet and mix with the feed gas at a temperature which results in the condensation of the $C_2^+$ fractions before entering the fractionator. A LNG reflux stream is temperature controlled to maintain fractionator overhead temperature. The fractionator bottoms temperature is controlled by a circulating reboiler stream.

8 Claims, 4 Drawing Sheets

(51) Int. Cl.
    *C01B 3/50*      (2006.01)
    *C10G 5/06*      (2006.01)
    *F25J 3/06*      (2006.01)

(52) U.S. Cl.
    CPC ........... *F25J 3/0233* (2013.01); *F25J 3/0238* (2013.01); *F25J 3/0242* (2013.01); *F25J 3/0252* (2013.01); *F25J 3/062* (2013.01); *F25J 3/064* (2013.01); *F25J 3/0635* (2013.01); *F25J 3/0655* (2013.01); *C01B 2203/046* (2013.01); *F25J 2200/02* (2013.01); *F25J 2205/02* (2013.01); *F25J 2205/30* (2013.01); *F25J 2210/04* (2013.01); *F25J 2210/12* (2013.01); *F25J 2210/62* (2013.01); *F25J 2215/62* (2013.01); *F25J 2270/904* (2013.01)

(56) References Cited

U.S. PATENT DOCUMENTS

| | | |
|---|---|---|
| 3,152,194 A | 10/1964 | Pohl et al. |
| 3,184,926 A | 5/1965 | Blake |
| 3,241,933 A | 3/1966 | Ploum et al. |
| 3,280,575 A | 10/1966 | Drake |
| 3,315,475 A | 4/1967 | Harmens |
| 3,367,122 A | 2/1968 | Tutton |
| 3,398,545 A * | 8/1968 | Nelson .................. F25J 1/0229 62/625 |
| 3,653,220 A | 4/1972 | Foster et al. |
| 3,735,600 A | 5/1973 | Dowdell et al. |
| 3,747,359 A | 7/1973 | Streich |
| 3,754,405 A | 8/1973 | Rosen |
| 3,792,590 A | 2/1974 | Lofredo et al. |
| 3,846,993 A | 11/1974 | Bates |
| 3,859,811 A | 1/1975 | Duncan |
| 3,892,103 A | 7/1975 | Antonelli |
| 3,902,329 A * | 9/1975 | King, III .................. C07C 7/04 62/630 |
| 3,919,853 A | 11/1975 | Rojey |
| 3,962,881 A | 6/1976 | Muska |
| 4,033,735 A | 7/1977 | Swenson |
| 4,170,115 A | 10/1979 | Ooka et al. |
| 4,279,130 A | 7/1981 | Finch et al. |
| 4,418,530 A | 12/1983 | Bodrov et al. |
| 4,424,680 A | 1/1984 | Rothchild |
| 4,430,103 A | 2/1984 | Gray et al. |
| 4,444,577 A | 4/1984 | Perez |
| 4,617,039 A | 10/1986 | Buck |
| 4,681,612 A | 7/1987 | O'Brien et al. |
| 4,710,214 A | 12/1987 | Sharma et al. |
| 4,751,151 A | 6/1988 | Healy et al. |
| 4,869,740 A | 9/1989 | Campbell et al. |
| 4,907,405 A | 3/1990 | Polizzotto |
| 4,936,888 A | 6/1990 | DeLong |
| 5,026,952 A | 6/1991 | Bauer |
| 5,062,270 A | 11/1991 | Haut et al. |
| 5,137,558 A | 8/1992 | Agrawal |
| 5,295,350 A | 3/1994 | Child et al. |
| 5,329,774 A | 7/1994 | Tanguay et al. |
| 5,425,230 A | 6/1995 | Shpak |
| 5,440,894 A | 8/1995 | Schaeffer et al. |
| 5,560,212 A | 10/1996 | Hansen |
| 5,678,411 A | 10/1997 | Matsumura et al. |
| 5,685,170 A | 11/1997 | Sorensen |
| 5,782,958 A | 7/1998 | Rojey et al. |
| 5,799,505 A | 9/1998 | Bonaquist et al. |
| 5,953,935 A | 9/1999 | Sorensen |
| 5,983,663 A | 11/1999 | Sterner |
| 6,089,022 A | 7/2000 | Zednik et al. |
| 6,089,028 A | 7/2000 | Bowen et al. |
| 6,131,407 A | 10/2000 | Wissolik |
| 6,138,473 A | 10/2000 | Boyer-Vidal |
| 6,182,469 B1 | 2/2001 | Campbell et al. |
| 6,266,968 B1 | 7/2001 | Redlich |
| 6,286,315 B1 | 9/2001 | Staehle |
| 6,378,330 B1 | 4/2002 | Minta et al. |
| 6,401,486 B1 * | 6/2002 | Lee .................. F25J 1/0022 62/623 |
| 6,432,565 B1 | 8/2002 | Haines |
| 6,517,286 B1 | 2/2003 | Latchem |
| 6,526,777 B1 | 3/2003 | Campbell et al. |
| 6,581,409 B2 | 6/2003 | Wilding et al. |
| 6,606,860 B2 | 8/2003 | McFarland |
| 6,640,555 B2 | 11/2003 | Cashin |
| 6,662,589 B1 | 12/2003 | Roberts et al. |
| 6,694,774 B1 | 2/2004 | Rashad et al. |
| 6,739,140 B2 | 5/2004 | Bishop et al. |
| 6,751,985 B2 | 6/2004 | Kimble et al. |
| 6,889,523 B2 | 5/2005 | Wilkenson et al. |
| 6,932,121 B1 | 8/2005 | Shivers, III |
| 6,945,049 B2 | 9/2005 | Madsen |
| 7,051,553 B2 | 5/2006 | Mak et al. |
| 7,107,788 B2 | 9/2006 | Patel et al. |
| 7,155,917 B2 | 1/2007 | Baudat |
| 7,219,502 B2 | 5/2007 | Nierenberg |
| 7,257,966 B2 | 8/2007 | Lee et al. |
| 7,377,127 B2 | 5/2008 | Mak |
| 8,429,932 B2 | 4/2013 | Lourenco et al. |
| 8,640,494 B2 | 2/2014 | Lourenco et al. |
| 8,850,849 B2 | 10/2014 | Martinez et al. |
| 8,887,513 B2 | 11/2014 | Kotzot et al. |
| 2002/0170297 A1 | 11/2002 | Quine et al. |
| 2003/0008605 A1 | 1/2003 | Hartford, Jr. et al. |
| 2003/0019219 A1 | 1/2003 | Viegas et al. |
| 2003/0051875 A1 | 3/2003 | Wilson |
| 2003/0182947 A1 | 10/2003 | Kimble et al. |
| 2003/0196452 A1 | 10/2003 | Wilding et al. |
| 2004/0065085 A1 | 4/2004 | Madsen |
| 2005/0086974 A1 | 4/2005 | Steinbach et al. |
| 2005/0244277 A1 | 11/2005 | Hurst, Jr. et al. |
| 2006/0213222 A1 | 9/2006 | Whitesell |
| 2006/0213223 A1 | 9/2006 | Wilding et al. |
| 2006/0242970 A1 | 11/2006 | Yang et al. |
| 2006/0260355 A1 * | 11/2006 | Roberts .................. F25J 1/0022 62/620 |
| 2007/0062216 A1 | 3/2007 | Mak et al. |
| 2007/0107465 A1 | 5/2007 | Turner et al. |
| 2008/0016910 A1 | 1/2008 | Brostow et al. |
| 2009/0113928 A1 | 5/2009 | Vandor et al. |
| 2009/0249829 A1 | 10/2009 | Lourenco |
| 2009/0282865 A1 | 11/2009 | Martinez et al. |
| 2010/0242499 A1 | 9/2010 | Lourenco et al. |
| 2010/0287985 A1 | 11/2010 | Martinez et al. |
| 2011/0036122 A1 | 2/2011 | Betting et al. |
| 2011/0067441 A1 * | 3/2011 | Martinez ................ F25J 3/0209 62/620 |
| 2011/0094263 A1 | 4/2011 | Wilding et al. |
| 2011/0174017 A1 | 7/2011 | Victory et al. |
| 2012/0060554 A1 | 3/2012 | Schmidt |
| 2012/0096896 A1 * | 4/2012 | Patel .................... F25J 3/0214 62/620 |
| 2012/0137726 A1 * | 6/2012 | Currence ............... F25J 3/0209 62/613 |

(56) References Cited

U.S. PATENT DOCUMENTS

2012/0169049 A1   7/2012  Oxner et al.
2013/0333416 A1   12/2013 Lourenco et al.

FOREIGN PATENT DOCUMENTS

| | | |
|---|---|---|
| CA | 2 467 338 A1 | 7/2003 |
| CA | 2 516 785 A1 | 9/2004 |
| CA | 2 552 366 A1 | 7/2005 |
| CA | 2 299 695 A1 | 7/2007 |
| CA | 2 536 075 C | 7/2007 |
| CA | 2 318 802 A1 | 2/2008 |
| CA | 2 777 760 A1 | 5/2011 |
| CA | 2 728 716 A1 | 7/2012 |
| CA | 2 515 999 A1 | 12/2012 |
| CA | 2 763 081 A1 | 6/2013 |
| CN | 1615415 A | 5/2005 |
| CN | 101948706 A | 1/2011 |
| DE | 44 16 359 A1 | 11/1995 |
| EP | 0 482 222 A1 | 4/1992 |
| EP | 0 566 285 A1 | 10/1993 |
| EP | 0 635 673 A1 | 1/1995 |
| EP | 0 780 649 A1 | 6/1997 |
| FR | 2 420 081 A1 | 10/1979 |
| GB | 1011453 | 12/1965 |
| GB | 2 103 354 A | 2/1983 |
| JP | 3-236589 A | 10/1991 |
| JP | 5-263998 A | 10/1993 |
| JP | 2002-295799 A | 10/2002 |
| JP | 2003-165707 A | 6/2003 |
| RU | 2 180 420 C2 | 3/2002 |
| RU | 2 232 342 C1 | 7/2004 |
| WO | 94/11626 A1 | 5/1994 |
| WO | 97/01069 A1 | 1/1997 |
| WO | 98/59205 A2 | 12/1998 |
| WO | 99/31447 A3 | 6/1999 |
| WO | 00/52403 A1 | 9/2000 |
| WO | 03/081038 A1 | 10/2003 |
| WO | 03/095913 A1 | 11/2003 |
| WO | 03/095914 A1 | 11/2003 |
| WO | 2004/010480 A1 | 1/2004 |
| WO | 2004/052511 A1 | 6/2004 |
| WO | 2004/109180 A1 | 12/2004 |
| WO | 2004/109206 A1 | 12/2004 |
| WO | 2005/045337 A1 | 5/2005 |
| WO | 2006/004723 A1 | 1/2006 |
| WO | 2006/019900 A1 | 2/2006 |
| WO | 2006/036441 A1 | 4/2006 |
| WO | 2008/006221 A1 | 1/2008 |
| WO | 2009/061777 A1 | 5/2009 |
| WO | 2012/015554 A1 | 2/2012 |
| WO | 2014/032179 A1 | 3/2014 |

OTHER PUBLICATIONS

Hudson, H.M., et al., "Reducing Treating Requirements for Cryogenic NGL Recovery Plants," Proceedings of the 80th Annual Convention of the Gas Processors Association, Mar. 12, 2001, San Antonio, Texas, 15 pages.

Hidnay, A.J., and W.H. Parrish, "Fundamentals of Natural Gas Processing," Taylor & Francis Group, Abingdon, U.K., © 2006, 440 pages.

* cited by examiner

METHOD TO RECOVER LPG AND CONDENSATES FROM REFINERIES FUEL GAS STREAMS

FIELD

This relates to a method that condenses and recovers low pressure gas (LPG) and condensates from fuel gas headers in oil refineries using Liquid Natural Gas (LNG) as a cryogenic process.

BACKGROUND

Refineries process crude oil by separating it into a range of components, or fractions, and then rearranging those into components to better match the yield of each fraction with market demand. Petroleum fractions include heavy oils and residual materials used to make asphalt or petroleum coke, mid range materials such as diesel, heating oil, jet fuel and gasoline, and lighter products such as butane propane and fuel gases. Refineries are designed and operated so that there will be a balance between the rates of gas production and consumption. Under normal operating conditions, essentially all gases that are produced are routed to the refinery fuel gas system, allowing them to be used for combustion equipment such as refinery heaters and boilers. Before the fuel gas is consumed at the refinery it is first amine treated to remove carbon dioxide and hydrogen sulfide before combustion. The treated typical refinery fuel gas systems are configured so that the fuel gas header pressure is maintained by using imported natural gas to make up the net fuel demand. This provides a simple way to keep the system in balance so long as gas needs exceeds the volume of gaseous products produced.

A typical refinery fuel gas stream is rich in hydrogen, $C_2^+$ and olefins. It is well known that gas streams can be separated into their component parts, involving chilling, expansion and distillation, to separate methane from heavier hydrocarbon components. Cryogenic processing of refinery fuel gas to recover valuable products (hydrogen, olefins and LPG) are a standard in the refining industry. Cryogenic processes in practice provide refrigeration by turbo-expansion of fuel gas header pressure re-compression and or mechanical refrigeration. Others have employed the use of membranes to first separate and produce a hydrogen stream and a hydrocarbon stream. In these cryogenic mechanical processes, there is a need for compression since typical fuel gas header pressures vary between 60 to 200 psi.

It is desirable therefore to have a process wherein the $C_2^+$ fractions from refinery fuel gas streams are efficiently and effectively separated as value added products. Cryogenic separation is typically viewed as being the most thermodynamically efficient separation technology. It is one of the first choices when higher value can be obtained from other products (olefins, LPG), especially when BTU removal from the fuel gas header system is of high priority. As will be discussed, the present process may be used to achieve high product recoveries from refinery fuel gases economically, both in capital and operating costs. The process does not require feed or product compression, so it is very reliable; pumps are the only rotating equipment. In addition, the present process offers the ability to regulate a refinery gas variable pressure and composition.

SUMMARY

There is provided a method to cool and condense the $C_2^+$ fractions from a treated refinery fuel gas stream, firstly by cooling the fuel gas to ambient temperature through an air cooling fin-fan exchanger, secondly by pre-cooling the fuel gas stream in a plate fin exchanger, and thirdly by adding and mixing a stream of Liquified Natural Gas (LNG) sufficient to meet the desired dew point of the $C_2^+$ fractions in the refinery fuel gas stream. The cooled refinery fuel gas stream is separated into a $C_2^+$ fraction and a $C_1^-$ fraction. The cold $C_1^-$ fraction is routed through the plate fin exchanger to give up its cold in the pre-cooling step before entering the fuel gas system. The $C_2^+$ fraction can be routed to a fractionation unit for products separation. The process can meet various modes of operation such as a $C_2^-$ fraction and a $C_3^+$ fraction streams, if so desired by controlling the temperature profile in the tower and LNG addition. At present, there is an incentive for the recovery of ethane as feed stock for the petrochemical industry.

In a preferred embodiment, there is provided a process for the recovery of $C_2^+$ fractions from a hydrocarbon containing refinery fuel gas stream comprised of hydrogen and $C_1$, $C_2$, $C_3^+$ hydrocarbons, comprising:

First, cooling the treated refinery fuel gas stream to ambient temperature in an air heat exchanger; alternatively a cooling water heat exchanger can also be employed.

Second, by pre-cooling the fuel gas stream in a cold box, acting as a reboiler to the tower bottoms and as a condenser to the tower overhead stream.

Third, the pre-cooled fuel gas stream is then mixed with a controlled stream of LNG to achieve the desired temperature to condense the desired liquids from the fuel gas stream. The mixture of liquids and gases enters a fractionation tower where the gases and liquids are separated. The liquids fraction is circulated through a reboiler and back to the tower to remove the light fraction in the stream. The gaseous fraction is stripped of its heavier components by a controlled reflux stream of LNG. The exiting produced cold vapour pre-cools the process feed gas giving up its cold energy before entering the fuel gas header.

A major feature of the process is its ability to operate under varying refinery flow rates, feed compositions, and pressures. Refinery fuel gas streams are variable since they are fed from multiple units. The inventive process can meet any refinery process plant variations, which are not uncommon in refinery fuel gas systems. The process is not dependent on plant refrigeration size and or equipment such as compressors employed in conventional LPG recovery processes.

The refrigeration plant is a supply of LNG which is added and directly mixed with the refinery fuel gas achieving the maximum heat transfer efficiency. The amount of LNG added is controlled on demand to meet desired product specs. Whereas, in conventional LPG recovery cryogenic plants, gas composition has an effect on the amount of compression horsepower required, richer gas generally requires more horsepower to achieve the same recovery level than a leaner gas because of having more heavy components. As inlet pressure decreases, more heat transfer area is required to achieve the same recovery level inside the cold box. As well, more exchanger area is required for ethane recovery than for propane recovery due to the higher amount of energy that must be transferred to cool the gas to the required temperatures.

Another benefit of the inventive process is the improvement of the refinery fuel gas stream. The reduced dew point of the fuel gas stream improves winter operations significantly. Thus, safety issues and operating difficulties associated with hydrocarbon condensate are eliminated.

As will hereinafter be described, the above method can operate at any refinery fuel gas operating conditions, resulting in substantial savings in both capital and operating costs.

The above described method was developed with a view to recover LPG from refinery fuel gas streams using LNG as a cryogenic process.

Accordingly there is provided a LPG recovery plant and process that includes cooling the refinery fuel gas stream to ambient temperature, pre-cooling the refinery fuel gas by cross exchange with fractionation unit bottom and overhead streams, adding and mixing LNG to directly cool and condense the desired liquid fractions, generating a two-phase stream that enters the fractionation unit. The fractionation unit is supplied at the top tray with LNG on demand as a reflux stream. At the bottom of the fractionation unit, a reboiler is provided to fractionate the light fractions from the bottom stream. The trays in the fractionation unit provide additional fractionation and heat exchange thus facilitating the separation. The fractionator generates two streams, a liquid stream (LPG) and a very cold vapour stream.

As will hereinafter be further described, the refinery feed gas is first cooled to ambient temperature, and secondly, the ambient cooled refinery feed gas stream is pre-cooled by the fractionator bottoms reboiler stream and the fractionator overhead cold vapour stream in a counter-current flow. To the pre-cooled refinery feed gas stream, a stream of LNG is added and mixed with the refinery feed gas to meet a selected fractionation unit operating temperature. The fractionator overhead temperature is controlled by a LNG reflux stream. The fractionator bottoms temperature is controlled by a circulating reboiler stream.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The method will now be described with reference to FIG. 1.

As set forth above, this method was developed with a view for cryogenic recovery of $C_2^+$ fractions from typical refinery fuel gas streams. The description of application of the method should, therefore, be considered as an example.

Figure 1:
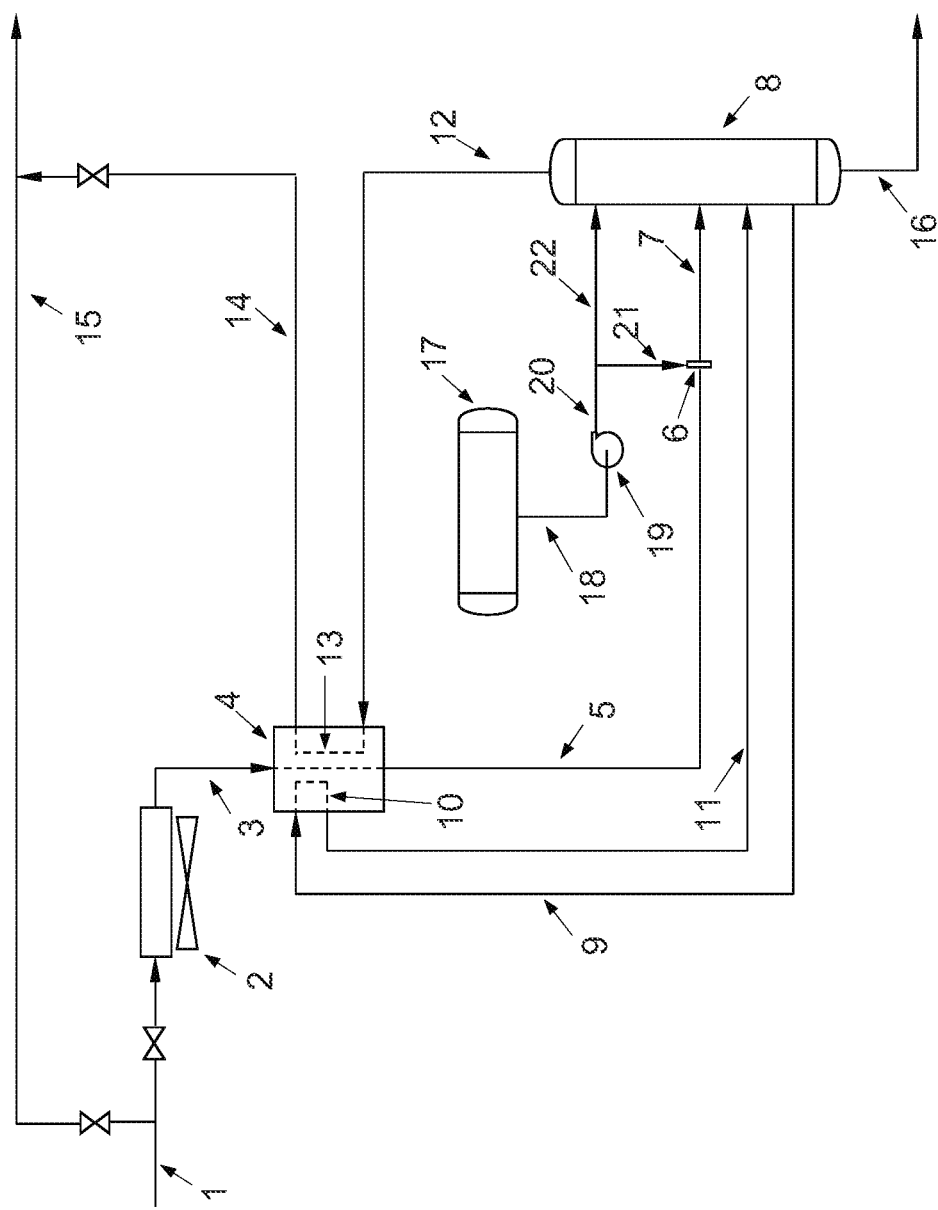
FIG. 1 is a schematic diagram of a gas liquids recovery facility equipped with a heat exchangers, a in-line mixer, a LNG storage bullet, pumps and a fractionator. The LNG is supplied to two locations: the in-line mixer and a reflux stream to the fractionator.

Referring to FIG. 1, a refinery feed gas stream 1 is cooled to ambient temperature in a fin-fan air heat exchanger 2. The ambient cooled refinery feed gas stream 3 enters a heat exchanger (cold box) 4. The heat exchanger (cold box) 4 houses the reboiler coils 10 and the overhead condenser coils 13. The stream 3 is first pre-cooled by a circulating reboiler stream 9 in a counter-current flow through coil 10, this counter-current heat exchange provides the heat required to fractionate the bottoms stream while cooling the inlet refinery gas stream. The reboiler re-circulation stream 9 feed rate is controlled to meet fractionator bottoms needs. The refinery feed gas stream is further cooled by a stripped fractionator overhead stream 12 in a counter-current flow through coil 13. This counter current heat exchange substantially cools the refinery feed gas stream. The pre-cooled refinery feed gas stream 5 exits heat exchanger (cold box) 4 and flows through in-line mixer 6 where LNG stream 21 is added and mixed as required to meet a selected stream temperature in stream 7. The two-phase temperature controlled stream 7 enters fractionator 8 to produce a vapour and a liquid stream. In this mode of operation, the fractionator 8 overhead vapour stream 12 is primarily a $C_1^-$ fraction. The fractionator 8 overhead temperature is controlled by a LNG reflux stream 22. The trays in the fractionator 8 provide additional fractionation and heat exchange thus facilitating the separation. The bottoms temperature in fractionator 8 is controlled by a circulating liquid stream 9 that gains heat through coil 10 in heat exchanger (cold box) 4. The heated circulating bottoms stream 11 is returned to the upper bottom section of fractionator 8 to be stripped of its light fraction. The fractionated liquid stream 16 is primarily a $C_2^+$ fraction. It exits fractionator 8 as its bottoms stream for further fractionation ie: a de-ethanizer, de-propanizer, etc.

The refrigerant used in the process is LNG which is stored in bullet 17. The LNG is added to the process through LNG feed line 18 to LNG pump 19. The pressurized LNG stream 20 supplies LNG through stream 21 to in-line mixer 6. The LNG stream 21 flowrate is controlled to meet a selected two-phase stream 7 temperature. Stream 21 is added and mixed with pre-cooled refinery gas stream 5 at in-line mixer 6 to produce a desired temperature two-phase stream 7. The LNG pressurized stream 21 also supplies LNG to reflux stream 22 that enters the top tray in fractionator 8. LNG reflux stream 22 controls the temperature at the top of fractionator 8.

A main feature of the process is the simplicity of the process which eliminates the use of compression and expansion and or external refrigeration systems. Another feature is the flexibility of the process to meet various operating conditions since only LNG is added on demand to meet process operations parameters. The process also provides for a significant savings in energy when compared to other processes since no compression or external refrigeration facilities are employed as in conventional cryogenic processes. The proposed process can be applied at any refinery fuel gas plant size.

Figure 2:
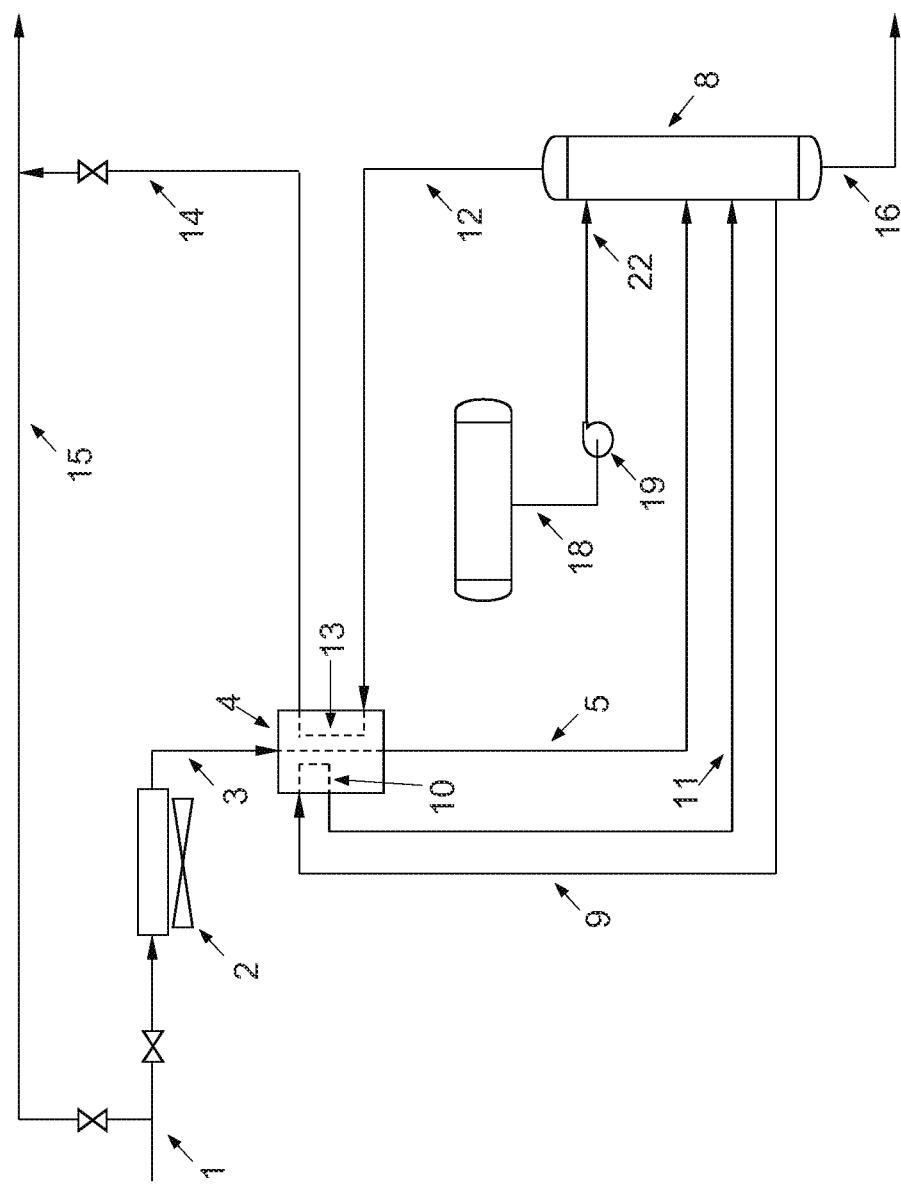
FIG. 2 is a schematic diagram of a gas liquids recovery facility equipped with a variation in the process whereas LNG is added only as a reflux stream.

Referring to FIG. 2, the main difference from FIG. 1 is the removal of in-line mixer 6. In this process mode, LNG is added only as a reflux stream to the top tray of fractionator 8. The temperature of the refinery feed gas stream 5 into fractionator 8 is fully dependent on the pre-cooling at heat exchanger (cold box) 4. The operation of the fractionator 8 bottoms is controlled by a circulating reboiler flowrate stream 9, through coil 10. The heated stream 11 flows back to the upper bottom section of fractionator 8, just as in FIG. 1. The temperature at the top of fractionator 8 is controlled by a LNG reflux stream 22. The trays in the fractionator 8 provide additional fractionation and heat exchange, thus facilitating the separation. This process orientation provides an alternative method to fractionate refinery feed gas at albeit less efficiency than when using an in-line mixer 6 as shown in FIG. 1.

Figure 3:
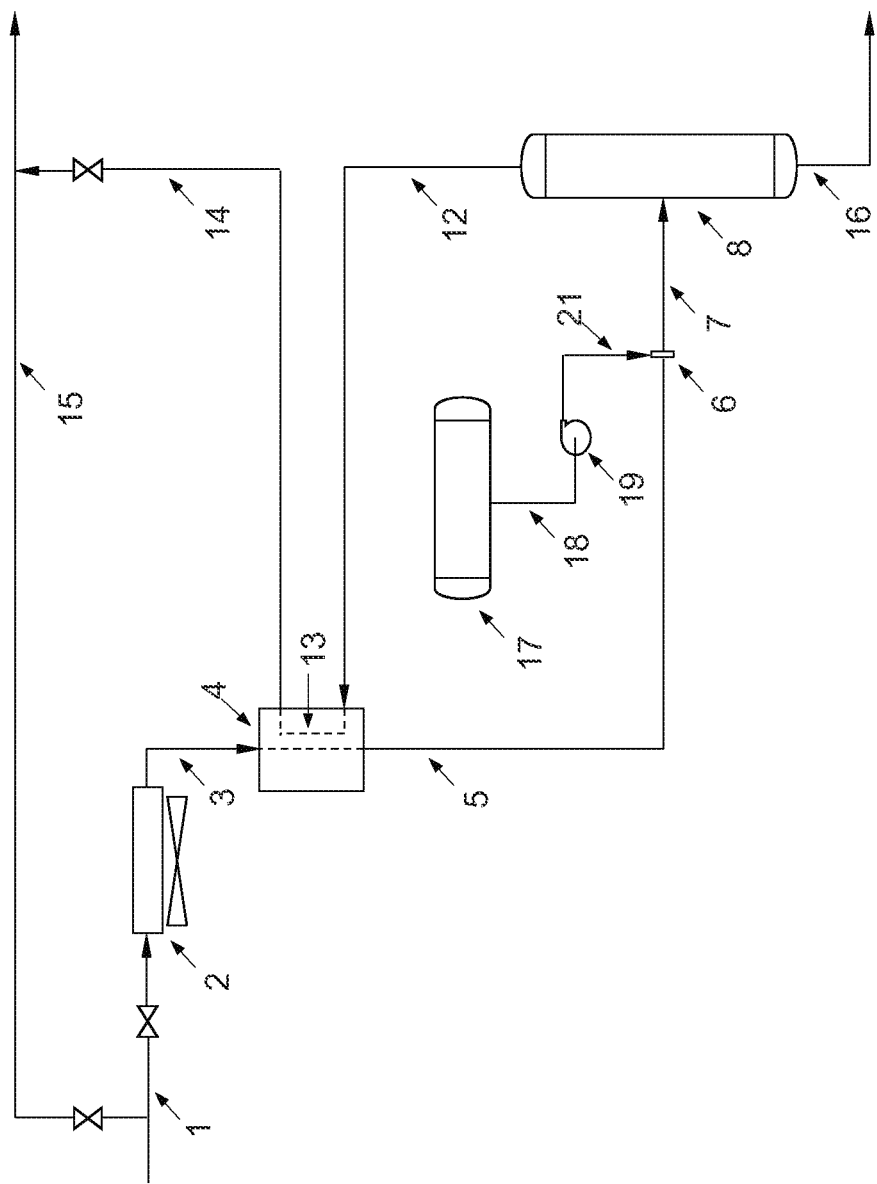
FIG. 3 is a schematic diagram of a gas liquids recovery facility equipped with a variation in the process whereas LNG is added only to the feed gas and mixed before fractionation.

Referring to FIG. 3, the main difference from FIGS. 1 and 2 is the removal of the reflux stream to the top of fractionator 8 and the removal of a circulating reboiler stream from the bottoms of fractionator 8. In this mode of operation, fractionator 8 becomes a simple gas/liquid separator where both vapour and liquid streams are not fractionated. This simple mode of operation allows for the recovery of LPG and reduction of the dew point in refinery fuel gas for combustion.

Figure 4:
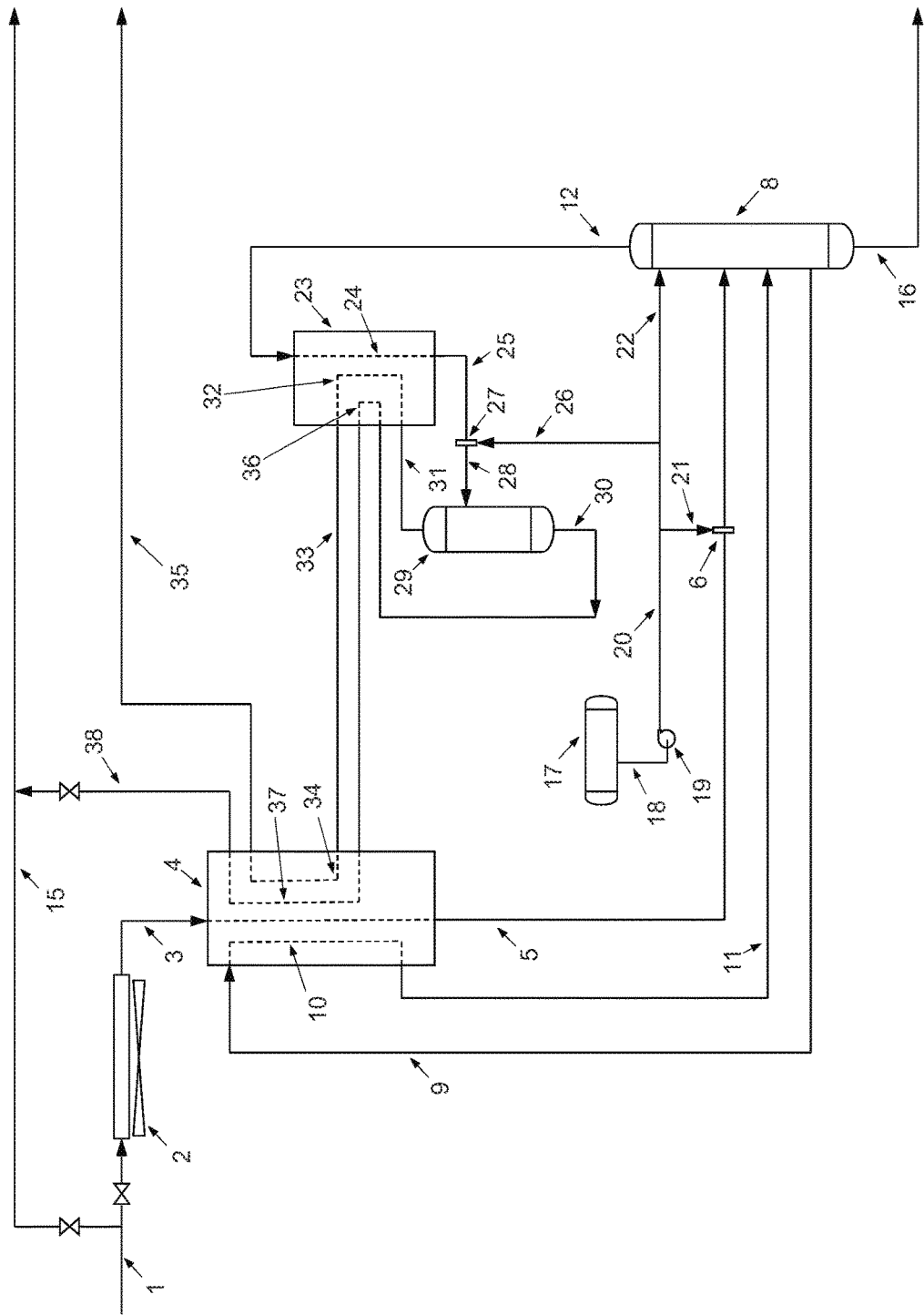
FIG. 4 is a schematic diagram of a gas liquids recovery facility with a variation in the process to recover liquids and also hydrogen from refinery fuel gas streams.

Referring to FIG. 4, the main difference from FIGS. 1-3 is the addition of an heat exchanger (cold box) 23 that houses coils 24, 32, and 36, in-line mixer 27, LNG addition line 26, and separator 29. In this process mode, LNG is also supplied through in-line mixer 27 to condense the $C_2^-$ fractions and separate it from the $H_2$ fraction in vessel 29. The objective is to recover an $H_2$ rich stream 31 that can be re-used in the refinery or sent to a PSA unit for further purification and use in the refinery. The addition of heat exchanger (cold box) 23 provides the ability to recover the cold energy from streams 30 and 31 and transfer this cold energy to stream 12 through coils 32, 36, and 24. The energy required to cool stream 25 is provided by adding LNG to mixer 27 through stream 26. The now-cooled stream 28 enters separator 29 to separate the $H_2$ fraction from the $C_1^+$ fractions. The condensed fraction stream 30 leaves separator 29 and enters heat exchanger 23 giving up some of its cold energy through coil 36, continuing onto heat exchanger 4, giving up its remaining cold energy through coil 37, and through stream 38 to fuel gas header 15. The gaseous fraction stream 31 leaves separator 29 and enters heat exchanger 23 giving up some of its cold energy through coil 32, continuing onto heat exchanger 4 giving up its remaining cold energy through coil 34, and to hydrogen recovery header 35. This process orientation provides an alternative method to recover and fractionate valuable components in the refinery feed gas, primarily; $H_2$, $C_2^+$ and $C_2^-$ fractions, the main difference being the additional recovery of $H_2$.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A method of recovering $C_2^+$ fractions from a refinery gas stream, the method comprising the steps of:
    obtaining the refinery gas stream, the refinery gas stream being in a vapor phase and comprising hydrogen, methane, $C_2$+ fractions, and olefins;
    injecting the refinery gas stream into a fractionator having a plurality of trays that enable heat exchange and fractionation within the fractionator, the fractionator having an overhead temperature and a bottoms temperature;
    using a liquid pump, pressurizing liquid natural gas (LNG) from a supplemental source of methane that is separate and distinct from the refinery gas stream, the liquid pump pressurizing LNG from a storage pressure of the supplemental source of methane to a refinery gas line pressure, the supplemental source of methane being in a liquid form and comprising a cryogenic energy source relative to the refinery gas stream;
    injecting an injection stream of the LNG at the refinery gas line pressure into the refinery gas stream via an inline gas mixer upstream of the fractionator such that the injection stream increases a methane content in the refinery gas stream, the injection of the injection stream being controlled to condense the $C_2^+$ fractions present in the refinery gas stream entering the fractionator;
    feeding a reflux stream of the LNG from the liquid pump to a top tray of the fractionator, the reflux stream being controlled to control the overhead temperature; and
    controlling the bottoms temperature by circulating a fluid stream between a bottom tray of the fractionator and a reboiler.

2. The method of claim 1, wherein the injection stream of the LNG is injected from the supplemental source of methane using a cryogenic feed pump.

3. The method of claim 1, wherein the bottoms temperature is controlled to achieve a predetermined fractionation of the $C_2^+$ fractions.

4. The method of claim 1, wherein the injection of the LNG into the refinery gas stream is controlled to maintain the refinery gas stream at a constant temperature immediately upstream of the fractionator.

5. The method of claim 1, further comprising a step of recovering $H_2$ from the refinery gas stream by:
    connecting a fractionator overhead line between a top of the fractionator and a separator, the fractionator overhead line comprising a gas heat exchanger and a second inline gas mixer upstream of the separator;
    removing a gas stream from the top of the fractionator through the fractionator overhead line, the fractionator overhead line carrying the gas stream to the separator;
    using the heat exchanger, pre-cooling the gas stream upstream of the second inline gas mixer; and
    using the second inline gas mixer, injecting a further stream of LNG from the the supplemental source of methane into the gas stream upstream of the separator, the injection of the further stream of LNG being controlled to condense and separate the methane and the $C_2$+ fractions from the gas stream at the separator to obtain the $H_2$.

6. The method of claim 1, wherein the refinery gas stream is pre-cooled upstream of the inline gas mixer in a heat exchanger.

7. The method of claim 6, wherein the refinery gas stream is pre-cooled in the heat exchanger by a vapor fraction of the fractionator.

8. The method of claim 6, wherein the reboiler comprises the heat exchanger.

* * * * *